US008958651B2

(12) United States Patent
Ding et al.

(10) Patent No.: US 8,958,651 B2
(45) Date of Patent: Feb. 17, 2015

(54) TREE-MODEL-BASED STEREO MATCHING

(71) Applicant: Seiko Epson Corporation, Tokyo (JP)

(72) Inventors: Yuanyuan Ding, Santa Clara, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 106 days.

(21) Appl. No.: 13/905,647

(22) Filed: May 30, 2013

(65) Prior Publication Data

US 2014/0355889 A1    Dec. 4, 2014

(51) Int. Cl.
*G06K 9/62* (2006.01)
*G06K 9/00* (2006.01)

(52) U.S. Cl.
CPC .................... *G06K 9/6201* (2013.01)
USPC ......................... 382/224; 382/154

(58) Field of Classification Search
CPC ............ G06K 9/00718; G06K 9/6218; G06K 9/6267; G06K 9/6219; G06K 9/6227; G06K 9/6278–9/6282; G06K 9/6201
USPC ................. 382/154, 192, 195, 209, 217–221, 382/224–228
See application file for complete search history.

(56) References Cited

U.S. PATENT DOCUMENTS

| | | | | |
|---|---|---|---|---|
| 4,944,023 A | * | 7/1990 | Imao et al. ..................... | 382/240 |
| 7,656,543 B2 | * | 2/2010 | Atkins ......................... | 358/1.13 |
| 8,175,412 B2 | | 5/2012 | Basri et al. | |
| 8,768,049 B2 | * | 7/2014 | Wang et al. ................... | 382/159 |
| 2011/0285701 A1 | | 11/2011 | Chen et al. | |
| 2012/0093421 A1 | * | 4/2012 | Kletter .......................... | 382/209 |
| 2012/0195495 A1 | * | 8/2012 | Shiell et al. .................... | 382/159 |
| 2014/0016830 A1 | * | 1/2014 | Wang et al. ................... | 382/115 |

FOREIGN PATENT DOCUMENTS

EP    2 386 998 A1    11/2011

OTHER PUBLICATIONS

Shekhovtsov, A., et al., "Efficient MRF Deformation Model for Non-Rigid Image Matching", IEEE, 2007.
Silpa-Anan, C., et al., "Optimised KD-trees for fast image descriptor matching" IEEE CVPR 2008.
Muja, M., et al., "Fast Approximate Nearest Neighbors with Automatic Algorithm Configuration", Conference on Computer Vision Theory, 2009.

* cited by examiner

*Primary Examiner* — Brian Le (57) ABSTRACT

Aspects of the present invention include feature point matching systems and methods. In embodiments, a tree model is used to find candidate matching features for query feature points. In embodiments, the tree model may be pre-learned using a set of sample images, or alternatively, the tree model may be constructed using one or more of the input images. In embodiments, features in one of the stereo images are registered with the tree model, and then features from the other stereo image are queried through the tree model to identify their correspondences in the registered stereo image. As compared to prior brute force matching methodologies, embodiments disclosed herein reduce the complexity and calculation time for determining matching feature points in stereo images.

14 Claims, 13 Drawing Sheets

TREE-MODEL-BASED STEREO MATCHING

BACKGROUND

1. Field of Invention

The present patent document is directed towards systems and methods for matching features between images.

2. Description of the Related Art

Feature or point matching has been a fundamental problem in many applications. These applications include video stabilization, motion estimation, image registration, object detection, as well as stereo matching. Although feature or point matching is important in many applications, it difficult to implement effectively and efficiently.

As its name implies, point set matching, or feature matching, involves matching query points in one image to points in another image. The most common prior approaches to the stereo matching problem use brute force matching in an attempt to find the closest match. However, such approaches are computationally complex and computationally long. For n sample points, the complexity is of the order of $O(n^2)$. Thus, as the number of points increases, the computation time and complexity significantly increases.

Accordingly, systems and methods are needed that can perform feature/point, matching but require less computational resources to accomplish the matching.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the scope of the invention to these particular embodiments.

DESCRIPTION OF THE PREFERRED EMBODIMENTS

In the following description, for purposes of explanation, specific details are set forth in order to provide an understanding of the invention. It will be apparent, however, to one skilled in the art that the invention may be practiced without these details. Furthermore, one skilled in the art will recognize that embodiments of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize that certain steps may be performed in different orders, including being done contemporaneously.

It shall be noted that although embodiments described herein may be within the context of point or feature matching in images (still or video), the invention elements of the current patent document are not so limited. Accordingly, the invention elements may be applied or adapted for use in other contexts and/or on other input sensor data.

1. Introduction

As noted above, there are issues with traditional stereo matching approaches. Previously, the most common method of identifying correspondences between stereo images was using a brute force approach. The brute force search method compares each feature in one image with every feature in another image to find its best correspondence. Such a brute force search method is expensive computationally, which thus results in the time complexity of the order $O(n^2)$.

Compared to the brute force search approaches, embodiments of the present invention reduce the matching complexity from $O(n^2)$ to $O(n \log(n))$ with little or no loss of the matching accuracy. In embodiments, the time for stereo matching may be further reduced by pre-training the tree model using a set of sample images. However, it should be noted that in alternative embodiments, the tree model may be constructed using the input images themselves.

2. Tree-Model-Based Matching

Figure 1:
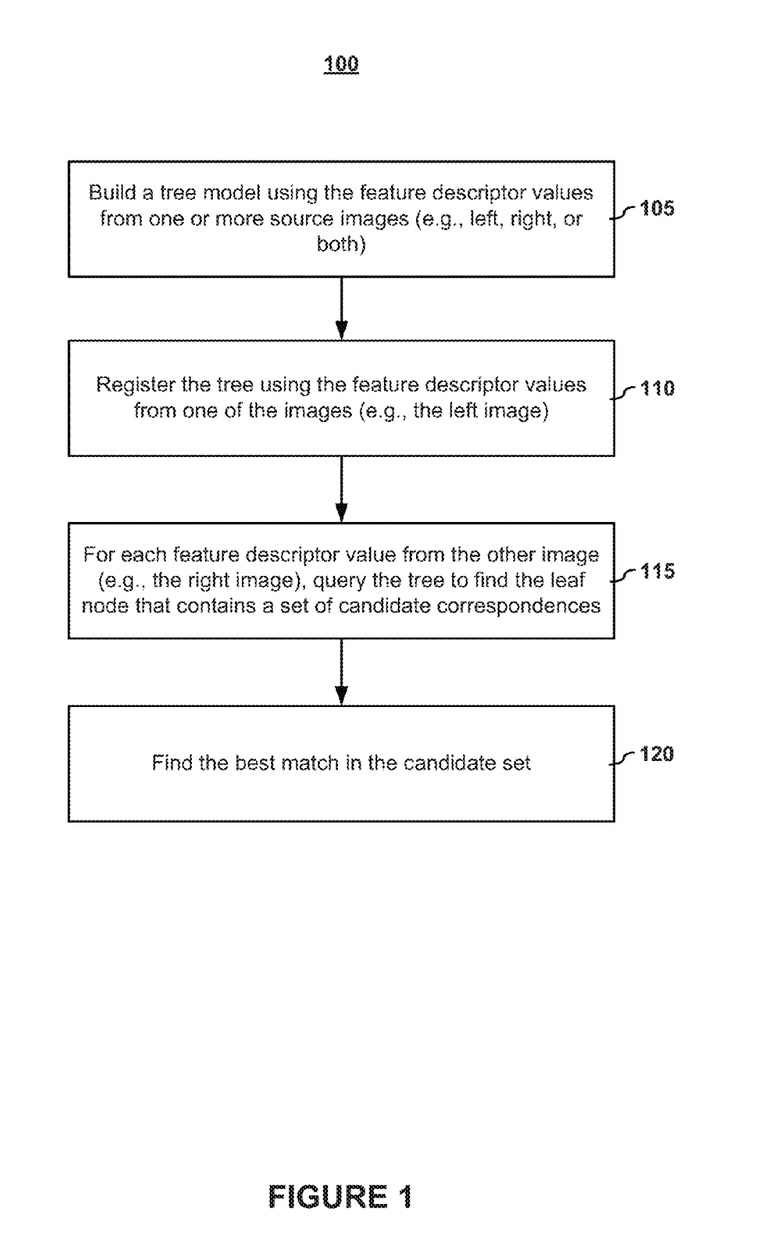
FIG. 1 depicts an overview of tree-based matching according to embodiments of the present invention.

FIG. 1 depicts an overview of tree-based matching according to embodiments of the present invention. In embodiments, finding matching feature points between two stereo images (e.g., a left image and a right image) comprises using a tree model to more efficiently and effectively identify candidate corresponding features.

a. Tree Model Building

As a general overview, in embodiments, a tree model may be built in two phases. First, a construction step builds a tree with descriptors from training/source images. And second, a registration step creates a Reverse Index (RI) table for each leaf node. In embodiments, the RI comprises a feature identifier (ID) that identifies a feature from a source image. In embodiments, the feature identifier (ID) is associated with the features descriptor value and a location in the source image for that feature. The feature, feature descriptor value, and/or the feature location may be referred to herein as a "point" or "data point." Also, it shall be noted that the elements that form the feature or its location may be more than just a single pixel but rather may be a region or regions of pixels. As a result of the training process, in embodiments, a tree model is built and registered in which leaf nodes have listings that correlate feature descriptor values that reach the leaf nodes with feature points and their locations.

As shown in FIG. 1, a tree model comprising leaf nodes may be generated (105) using feature descriptor values sampled from one or more source images. In embodiments, the source images may be one or both of the stereo images, training images, or some combination thereof. In embodiments, a sampled point corresponds to a feature descriptor, which may be any feature descriptor used to identify a feature. Examples of feature descriptors that may be used include, but are not limited to: Scale-invariant feature transform (SIFT), BRIEF, Oriented Fast and Rotated Brief (ORB), etc. One skilled the art shall recognize that any of a number of feature descriptors may be used.

Figure 2:
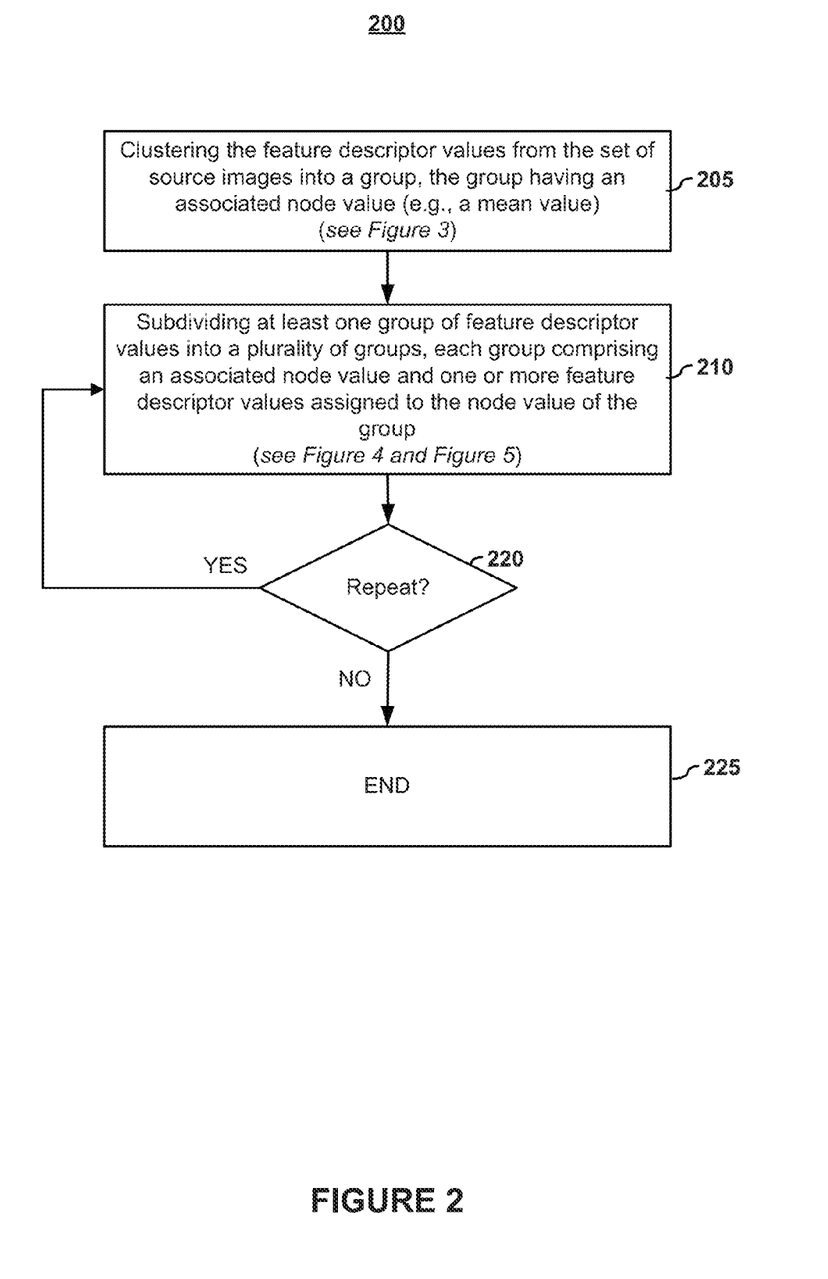
FIG. 2 depicts a method for recursive clustering to build a hierarchical k-means tree model according to embodiments of the present invention.
Figure 3:
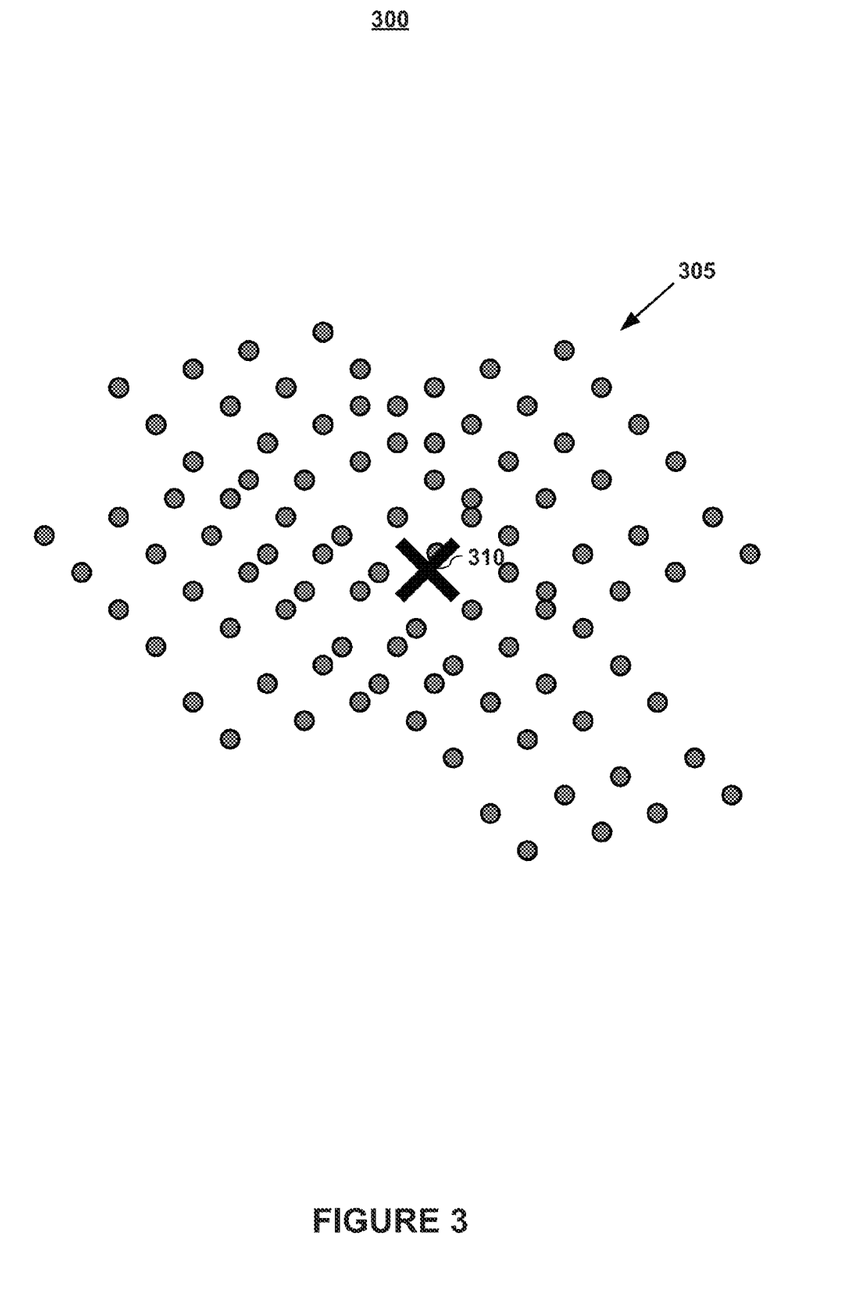
FIGS. 3-5 graphically depict recursive clustering according to embodiments of the present invention.

In embodiments, the tree model may be a hierarchical k-means tree model. FIG. 2 depicts a method for recursive clustering to build a hierarchical k-means tree model according to embodiments of the present invention. In embodiments, the method commences by clustering (205) the feature descriptor values from the set of source images into a group under a single associated node value or center. In embodiments, the associated node value of the group may be an average (which may be a mean, median, or mode value) of the group. FIG. 3 graphically depicts a set of feature descriptor values 305 that have been clustered under a single node value represented by the "X" 310 according to embodiments of the present invention.

Figure 4:
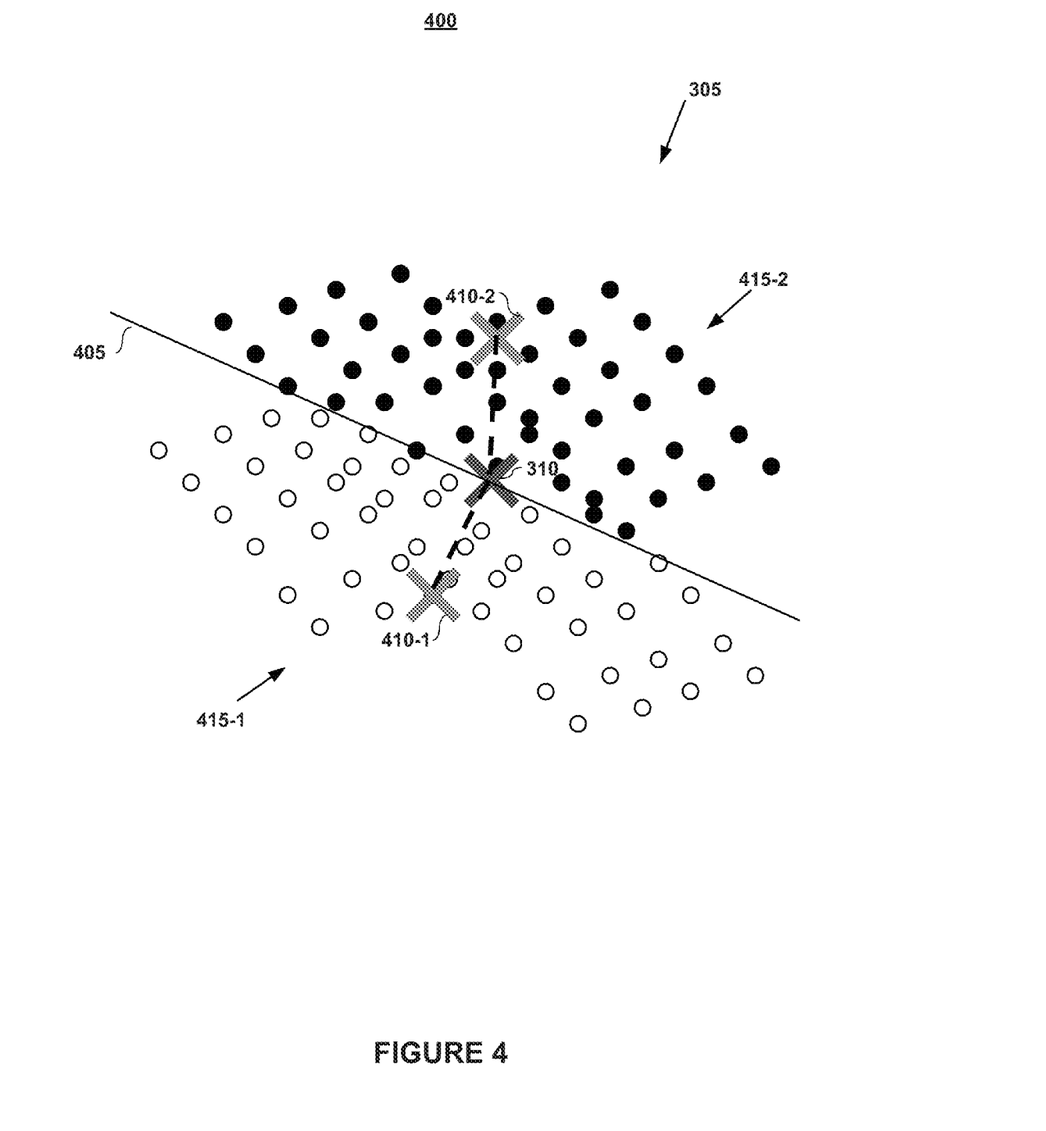

Returning to FIG. 2, the group of feature descriptor values is subdivided (210) into a plurality of groups. In embodiments, the number of subdivided groups may be any number; however, in embodiments depicted herein the number is 2. Each of the new subdivided groups comprising an associated node value, such as mean value, and one or more feature descriptor values that have been assigned to that node value. FIG. 4 graphically illustrates the forming of new groups from the prior group 305. As shown in FIG. 4, the group of feature descriptor values 305 has been subdivided 405 into two groups 415-1 and 415-2. Each group has an associated node value 410-1 and 410-2, and data points are assigned to or associated with the new node values. As noted above, in embodiments, the associated node value of the group may be an average (which may be a mean, median, or mode value) of the group.

Figure 5:
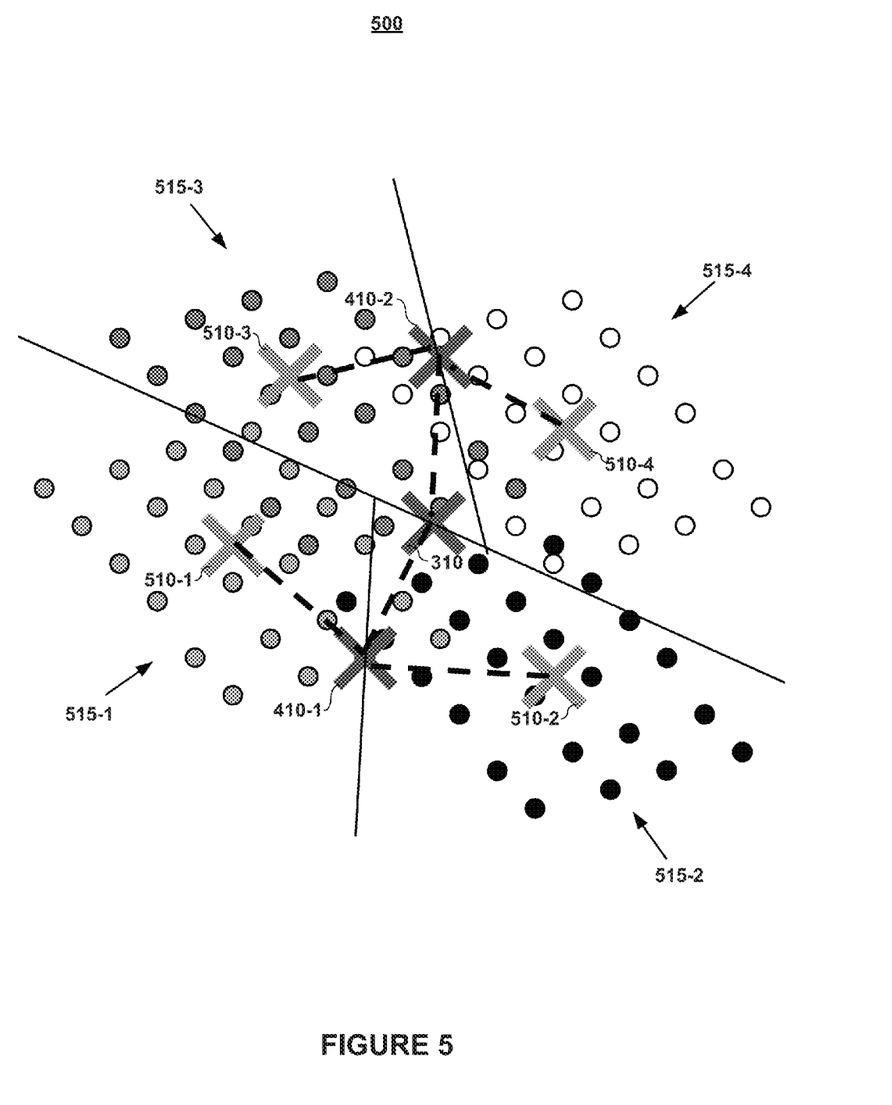

In embodiments, this step may be recursively performed (220). FIG. 5 graphically illustrates the forming of new groups from the prior groups shown in FIG. 4. As shown in FIG. 5, each of the prior groups of feature descriptor values 415-1 and 415-2 (FIG. 4) have been subdivided into two groups. Group 415-1 was subdivided into groups 515-1 and 515-2, and group 415-2 was subdivided into groups 515-3 and 515-4. It shall be noted that, in embodiments, the number of subdivisions per group, per recursion, or both need not be the same. As shown in FIG. 5, each group (515-1, 515-2, 515-3, and 515-4) has an associated node value 510-1, 510-2, 510-3, and 510-4, respectively, and that data points are assigned to or associated with these new node values. As noted above, in embodiments, the associated node value of the group may be an average (which may be a mean, median, or mode value) of the group.

In embodiments, the subdividing step 220 may be recursively performed until a stop condition is reached (225). In embodiments, the stop condition may be that the subdividing process (i.e., step 210) is performed a set number of times. Alternatively or additionally, one or more other stop conditions may be employed. For example, stop conditions may include stopping when the maximum distance of two descriptors in the group is less than a threshold, or the number of descriptors in the group is less than a particular pre-set threshold number. One skilled in the art shall recognize that as a result of the recursively process, a hierarchical k-means tree model has been created in which the node values form nodes of the tree structure and last set of node values may be used as the leaf node values.

One skilled in the art shall recognize that other methods or modified methods may be used to generate a tree model. Also, although a tree model may be generated, it shall be noted that a tree model or parts thereof may be previously generated and used in systems and methods depicted herein.

Figure 6:
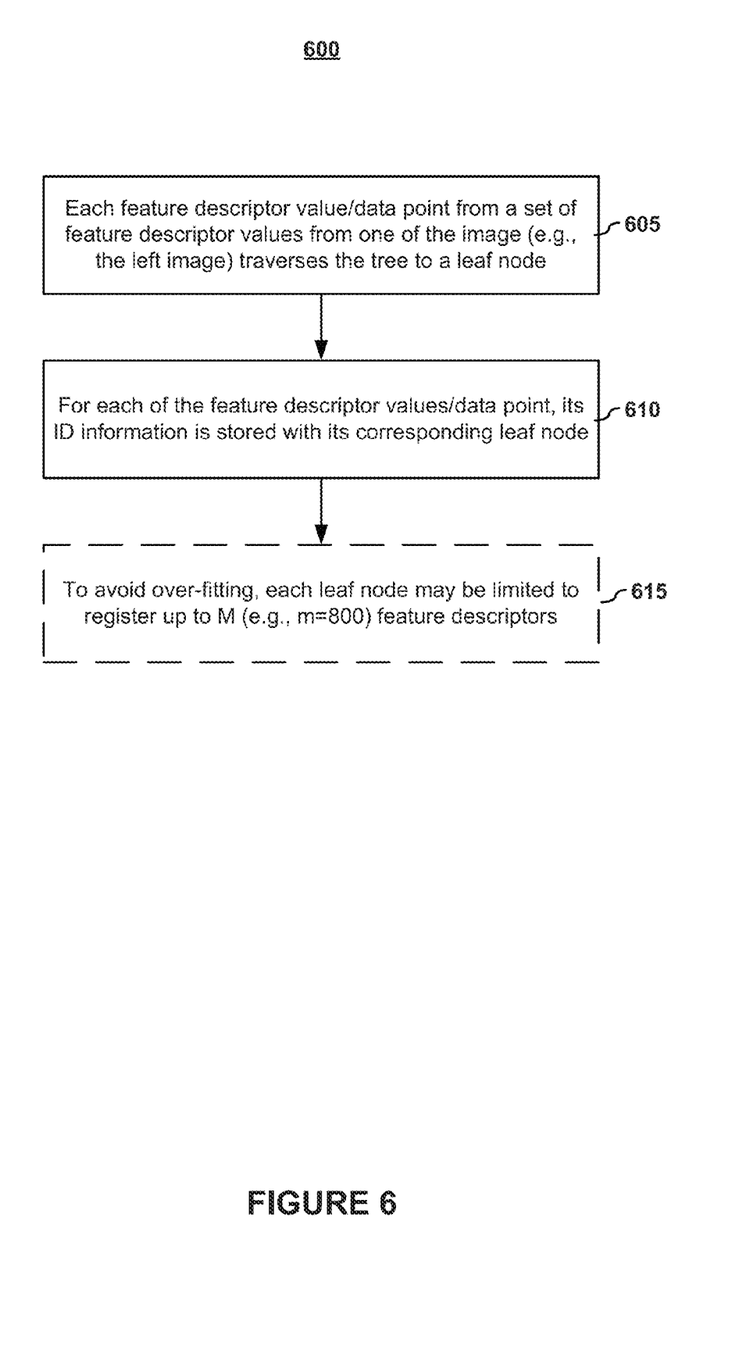
FIG. 6 depicts a method for registering data points, or features, on a tree model according to embodiments of the present invention.

Returning to FIG. 1, given a tree model, the tree may be used to order sampled features from an image so that feature correspondences may be more efficiently and effectively identified. Thus, in embodiments, features may be sampled or otherwise obtained from a first image (e.g., a left image) in a stereo pair of images. In embodiments, each feature has a feature descriptor value, a location in the first image, and a feature identifier. It shall be noted that the feature identifier may comprise the feature descriptor value, the feature location, or both; however, other identifiers may be used. As shown FIG. 1, features from the first image may be registered (110) into the tree model, such that at least some of the leaf nodes of the tree model are associated with one or more feature identifiers of features from the first image. FIG. 6 depicts a method for registering data points, or features, on a tree model according to embodiments of the present invention.

As shown in FIG. 6, for each feature descriptor value from a set of feature descriptor values taken from one of the stereo images (e.g., the left image), the registration process commences by, traversing (605) the tree model to a leaf node having an associated feature value that most closely matches the feature descriptor value. Once a leaf node has been identified for a feature, the feature's identifier information is stored (610) with its corresponding leaf node. Consider, by way of illustration, the method graphically depicted in FIG. 7.

Figure 7:
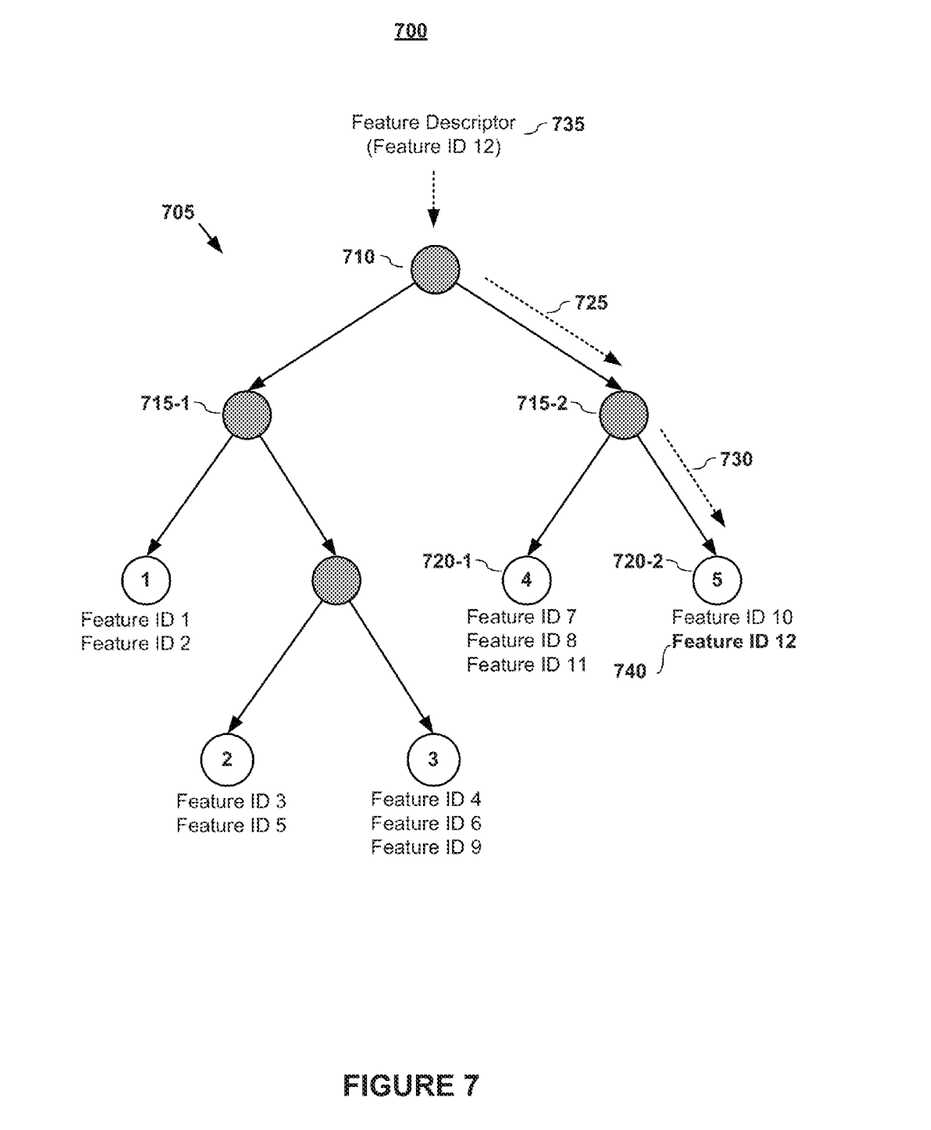
FIG. 7 graphically depicts registering a data point, or feature, on a tree model according to embodiments of the present invention.

FIG. 7 graphically depicts registering a data point, or feature, 735 on a tree model 705 according to embodiments of the present invention. Given a tree model 705, a feature descriptor value 735 is input into the tree model. The feature 735 moves through the tree structure based upon descriptor value—when faced with a branching, it is moves to the node having a value that is closer/closest to the feature descriptor value. For example, between the value represented by node 715-1 and the value represented by node 715-2, the node 715-2 represents a value that is closer to the feature descriptor value 735. Therefore, the feature descriptor value 735 follows a path 725 to node 715-2, at which point the next decision is made. That is, the inquiry is whether the feature descriptor value 735 is closer to the value represented by node 720-1 or the value represented by node 720-2. In the depicted embodiment, the feature descriptor value 735 is deemed closer in value to node 720-2. Node 720-2 is the last node in this branch of the tree model 705 and therefore is a leaf node (Leaf Node 5). Having reached a leaf node, the reverse index is updated such that Leaf Node 5 is associated with the feature identifier (Feature ID 12) 740 of the feature 735.

Returning to FIG. 6, in embodiments, to avoid over-fitting, each leaf node may be limited (615) to register up to M (e.g., 800) feature descriptors.

Once the feature descriptor values from one of the images have been registered, the tree model with the registered features may be used to find corresponding features in the other image.

b. Querying the Tree Model

Returning to FIG. 1, for each feature descriptor from the other image (e.g., the right image), the tree is queried (115) to find the leaf node that contains a subset of candidate correspondences. Embodiments of the tree-model-based stereo matching methodology comprise sampling to select representative features from the other stereo image (e.g., the right image) for matching. These sampled features are queried (115) through the tree model to identify their optimal correspondences in the first registered stereo image (e.g., the left image). An illustration of this process is shown in FIG. 8.

Figure 8:
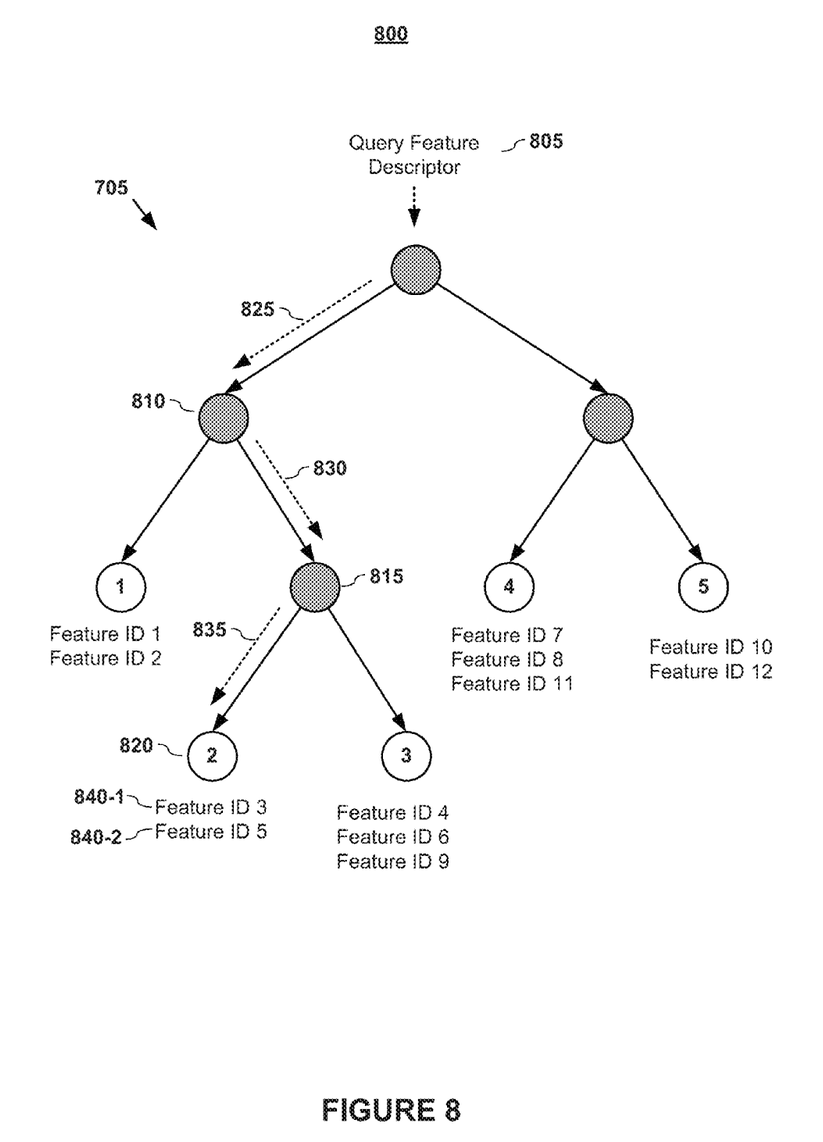
FIG. 8 graphically depicts identifying a set of candidate corresponding features using a tree model according to embodiments of the present invention.

FIG. 8 graphically depicts identifying a set of candidate corresponding features using a tree model according to embodiments of the present invention. As depicted in FIG. 8, the goal of the query process is to quantize each query descriptor value 805 to the closest leaf node in a trained tree model 705. In embodiments, the query descriptor 805 is input into the tree model 705 and based upon comparisons of node descriptor values with the query feature descriptor value 805, the query descriptor 805 progresses 825, 830, and 835 until it reaches a leaf node 820, which has an associated descriptor value that most closely resembles the query feature descriptor value 805. As seen in FIG. 8, associated with the leaf node 820 is a reverse index that includes information about the candidate correspondences or matching points (840-1 and 840-2) from the other image. In this example, there are two candidate matching points, 840-1 and 840-2, which form the set of candidate correspondences with the query feature. One feature point is identified as Feature ID 3 (840-1), and the other feature point has a different object identifier, Feature ID 5 (840-2). It shall be noted that, in embodiments, the reverse index may include additional information.

Thus, for each query descriptor from a set of query descriptors, the query descriptor is input into a tree model to identify its closest leaf node and thereby obtain one or more candidate matching points and their corresponding locations from the reverse index for that leaf node.

c. Selecting the Best Match Feature

Figure 9:
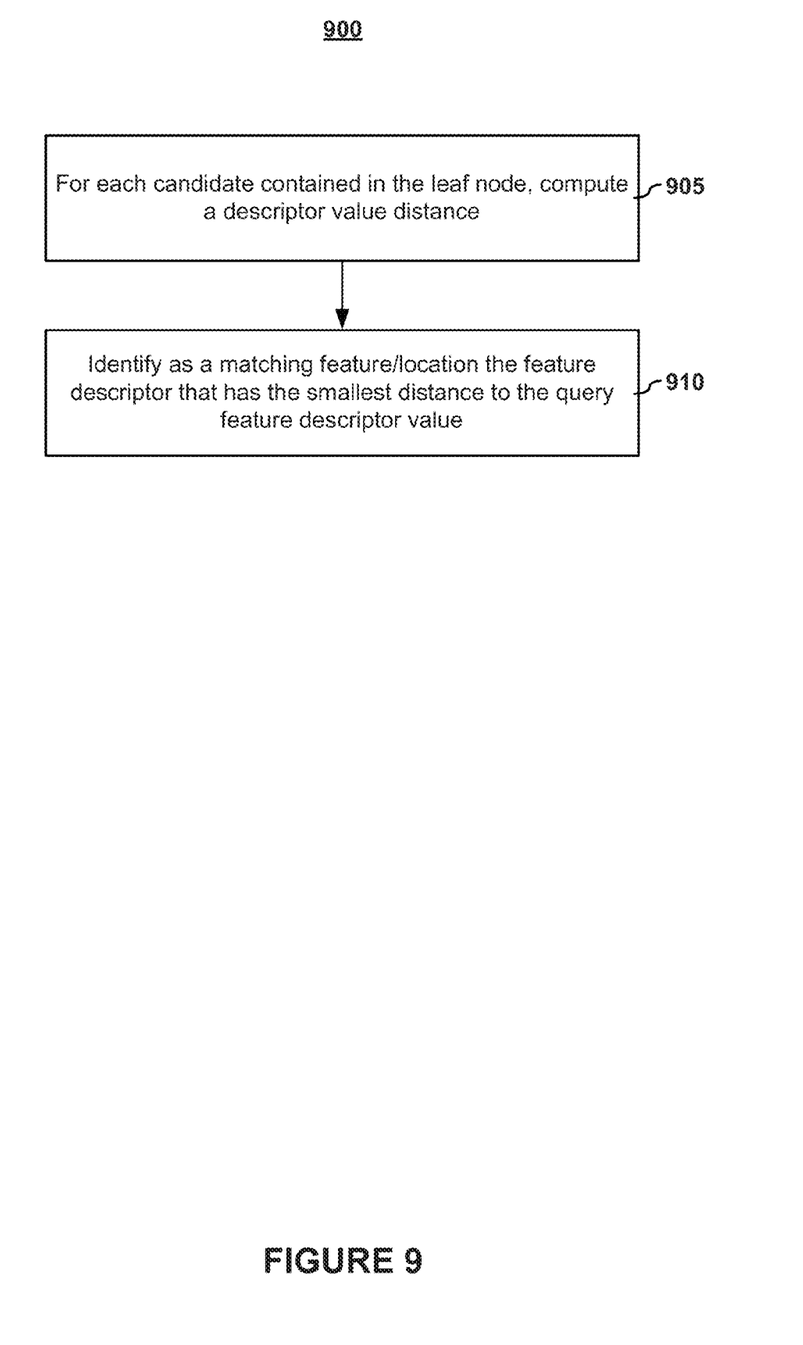
FIG. 9 depicts a method for identifying a matching or corresponding point or feature for a query feature according to embodiments of the present invention.

By using the tree model, a set of candidate correspondences in the first image for the query feature in the second image is efficiently and effectively obtained. Returning the FIG. 1, from this set of candidate correspondences, a best match can be selected (120). FIG. 9 depicts a method for identifying a matching or corresponding point or feature for a query feature according to embodiments of the present invention. As shown in FIG. 9, for each candidate corresponding feature (e.g., Feature ID 3 (840-1) and Feature ID 5 (840-2) in FIG. 8) of the identified leaf node, a descriptor value distance is computed (905) between each candidate corresponding feature descriptor value and the query feature descriptor value. In embodiments, the feature descriptor values for these candidate corresponding features are obtained using the feature identifiers. In embodiments, the feature descriptor values may be obtained directly from the identifier (e.g., if the identifier is or contains the feature descriptor value) or indirectly (such as through a look-up table or the reverse index). Based upon the distances, the candidate corresponding feature point with the shortest distance is selected (910) as the matching point for the query feature point. Given that the locations of the query feature in the second image and the selected corresponding feature in the first image, this information can be used for multiple purposes. For example, with a set of matching or corresponding features between the two images, a three-dimensional representation of at least a portion of the stereo images may be generated.

As previously noted, compared to the brute force search approaches, embodiments of the present invention reduce the matching complexity from $O(n^2)$ to $O(n \log(n))$ with little or no loss of the matching accuracy. In embodiments, the time for stereo matching may be further reduced by pre-training the tree model using a set of sample images. Being able to rapidly obtain matching feature points between images can be important, particularly for real-time implementations, such as displays and three-dimensional printing.

3. Computing System Embodiments

Figure 10:
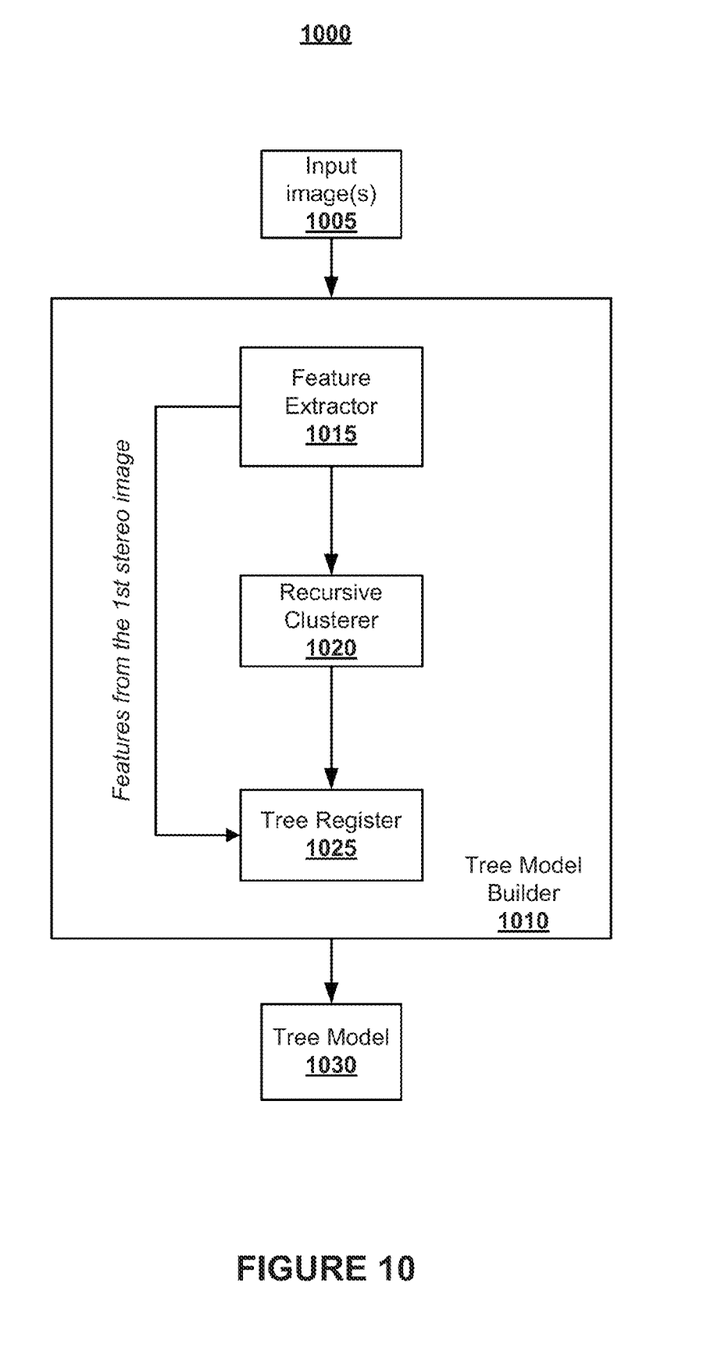
FIG. 10 graphically depicts a tree model builder system according to embodiments of the present invention.

Turning now to FIG. 10, graphically depicted is a tree model builder system according to embodiments of the present invention. In embodiments, the tree model builder system 1010 comprises a feature extractor 1015, a recursive clusterer 1020, and a tree register 1025.

In embodiments, the tree model builder system 1010 receives as input one or more source images 1005. Feature descriptor extractor receives the one or more source images 1005 and generates a set of features. Examples of feature descriptors that may be used include, but are not limited to: Scale-invariant feature transform (SIFT), BRIEF, Oriented Fast and Rotated Brief (ORB), etc. One skilled the art shall recognize that any of a number of feature descriptors may be used.

Some or all of the features extracted from the source image(s) are provided as input to the recursive clusterer 1020. In embodiments, the recursive clusterer 1020 uses the extracted features to generate a hierarchical k-means tree model. In embodiments, the recursive clusterer 1020 may perform the method depicted in FIG. 2. In embodiments, the recursive clusterer 1020 outputs the tree model, which is provided to the tree register 1025.

In embodiments, the tree register 1025 receives as input the tree model and a set of features from one of the stereo images for registration into the tree. In embodiments, the registration process may be performed as described with respect to FIGS. 6 and 7.

In embodiments, the stereo image may be one of the input images. As such, features for this image were obtained by the feature extractor 1015, as discussed above. Alternatively, the stereo images may be separately input into the tree model builder apart from the input image(s) 1005. In such cases, one or both of the stereo images may undergo processing by the feature extractor 1015 to obtain features for registration by the tree register 1025.

It shall be noted that in alternative embodiments the tree model builder 1010 may receive or use a pre-built tree model and simply register features from one of the stereo images.

After registration, the tree model 1030 is output by the tree model builder 1010 and is ready to be used to find corresponding matches in the other stereo image.

Figure 11:
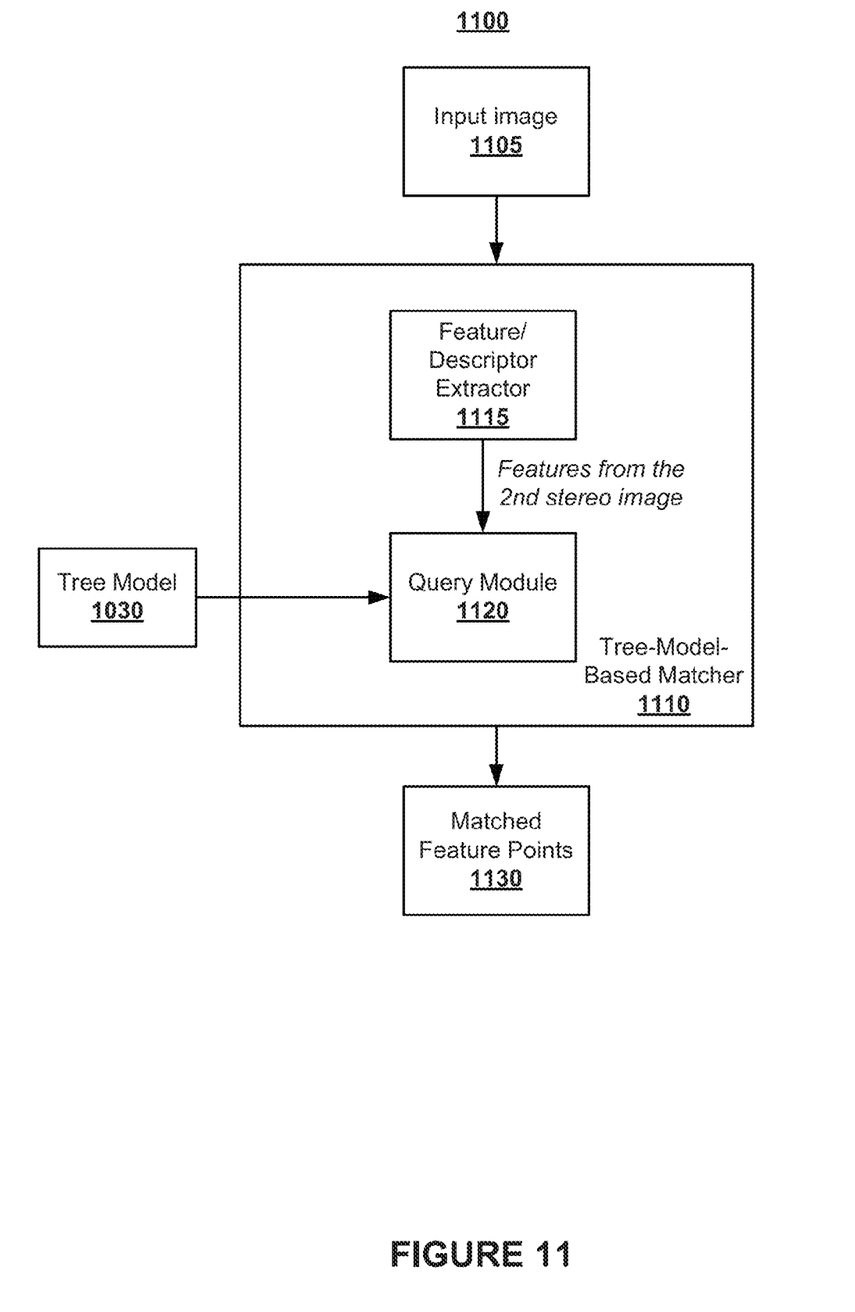
FIG. 11 graphically depicts a tree-model-based matcher system according to embodiments of the present invention.

Turning to FIG. 11, graphically depicted is a tree-model-based matcher system that uses the tree model to find correspondences according to embodiments of the present invention. In embodiments, the tree-model-based matcher system 1110 comprises a feature extractor 1115 and a query module 1120.

In embodiments, the feature descriptor extractor 1115 receives as input the other stereo image 1105 and generates a set of features. In embodiments, the feature descriptor extractor 1115 may be the same as the extractor 1015 in the tree model builder 1010 in FIG. 10. In either embodiment, feature descriptors are extracted from the second stereo image in like manner as was done for the first stereo image.

Some or all of the features extracted from the second stereo image are provided as input to the query module 1120. The query module receives the features and the tree model with the registered features from the first stereo image 1030 and finds matching feature points between the two images. In embodiments, the query module may find corresponding matching feature points using the methods described above with respect to FIG. 8 and FIG. 9. The corresponding or matched features points 1130 are then output. The matched feature points may be used to generate a tree-dimensional representation of at least a portion of the image depicted in the stereo images.

Figure 12:
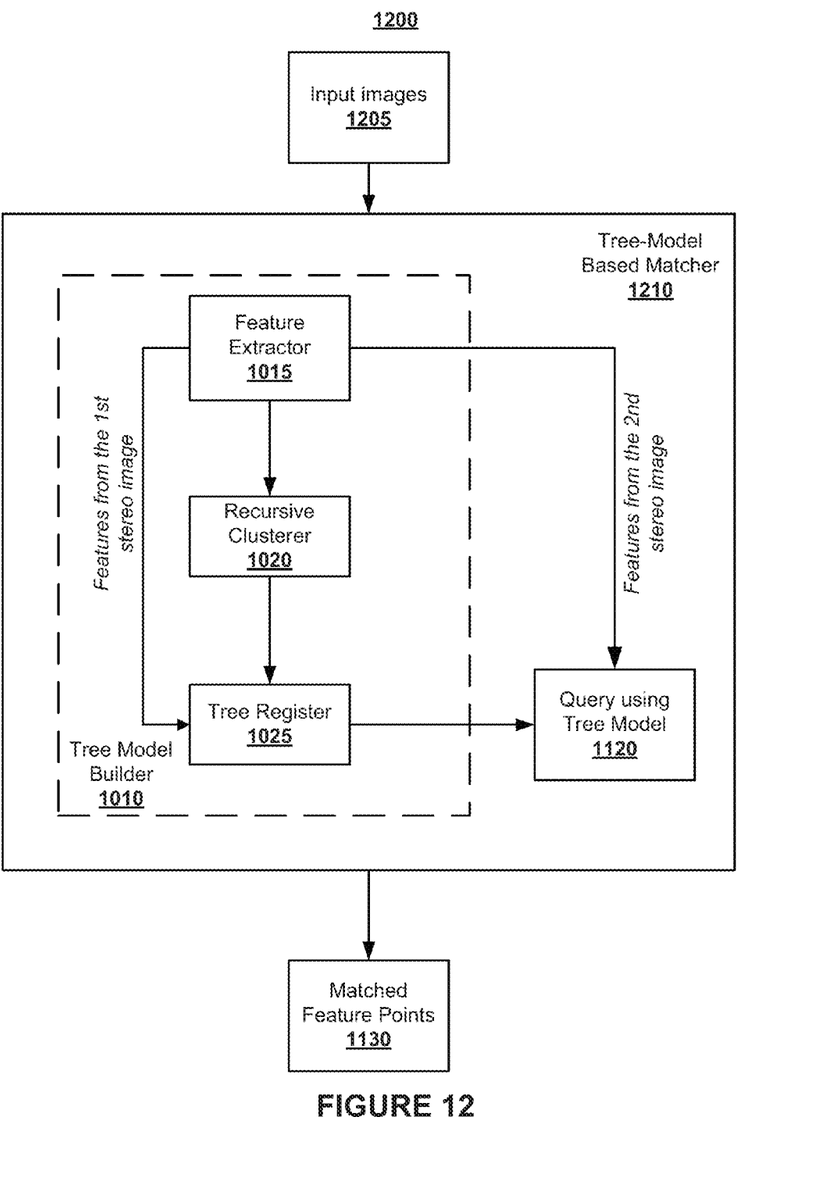
FIG. 12 graphically depicts a tree-model-based matcher system according to embodiments of the present invention.

One skilled in the art shall recognize that the systems of FIG. 10 and FIG. 11 may be combined in to a single system. FIG. 12 graphically depicts a tree-model-based matcher system 1210 that includes a tree model builder system 1010 according to embodiments of the present invention.

Figure 13:
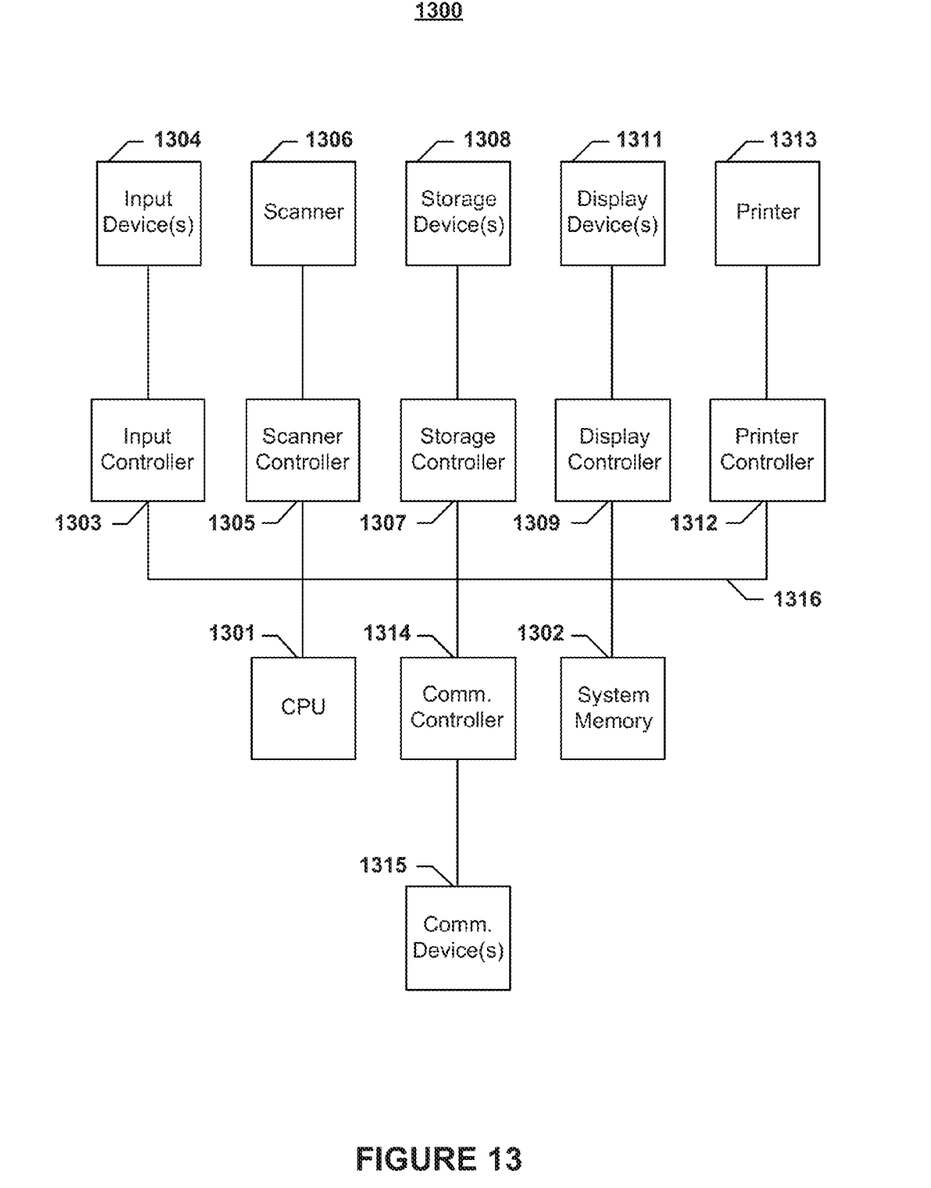
FIG. 13 depicts a block diagram illustrating an exemplary computing system which may be used to implement aspects of the present invention.

Having described the details of the invention, an exemplary system 1300, which may be used to implement one or more aspects of the present invention, will now be described with reference to FIG. 13. As illustrated in FIG. 13, the system includes a central processing unit (CPU) 1301 that provides computing resources and controls the computer. The CPU 1301 may be implemented with a microprocessor or the like, and may also include a graphics processor and/or a floating point coprocessor for mathematical computations. The system 1300 may also include system memory 1302, which may be in the form of random-access memory (RAM) and read-only memory (ROM).

A number of controllers and peripheral devices may also be provided, as shown in FIG. 13. An input controller 1303 represents an interface to various input device(s) 1304, such as a keyboard, mouse, or stylus. There may also be a scanner controller 1305, which communicates with a scanner 1306. The system 1300 may also include a storage controller 1307 for interfacing with one or more storage devices 1308 each of which includes a storage medium such as magnetic tape or disk, or an optical medium that might be used to record programs of instructions for operating systems, utilities and applications which may include embodiments of programs that implement various aspects of the present invention. Storage device(s) 1308 may also be used to store processed data or data to be processed in accordance with the invention. The system 1300 may also include a display controller 1309 for providing an interface to a display device 1311, which may be a cathode ray tube (CRT), a thin film transistor (TFT) display, or other type of display. The system 1300 may also include a printer controller 1312 for communicating with a printer 1313. A communications controller 1314 may interface with one or more communication devices 1315, which enables the system 1300 to connect to remote devices through any of a variety of networks including the Internet, a local area network (LAN), a wide area network (WAN), or through any suitable electromagnetic carrier signals including infrared signals.

In the illustrated system, all major system components may connect to a bus 1316, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

What is claimed is:
1. A computer-implemented method for feature matching, the method comprising:
   generating a hierarchical k-means tree model comprising leaf nodes using feature descriptor values from a set of source images;

given a set of features from a first image, each feature comprising a feature descriptor value, a location in the first image, and a feature identifier, registering into the tree model the set of features from the first image such that at least some of the leaf nodes of the tree model are associated with one or more feature identifiers of features from the first image; and for each query feature from a set of features from a second image, each feature from the second image comprising a feature descriptor value and a location in the second image:

querying the tree model to identify a leaf node that most closely corresponds to the query feature's corresponding feature descriptor value; and selecting a best match feature in the first image from the one or more feature identifiers that are registered with the identified leaf node;

wherein the step of generating the hierarchical k-means tree model includes using recursive clustering and comprises:

[a] clustering the feature descriptor values from the set of source images into a group, the group having an associated node value;

[b] subdividing at least one group of feature descriptor values into a plurality of groups, each group comprising an associated node value and one or more feature descriptor values assigned to the node value of the group; and

[c] repeating step [b] until a stop condition is reached.

2. The computer-implemented method of claim 1 wherein a stop condition comprises at least one of:

when a maximum distance of two feature descriptor values in a group is less than a threshold distance; and the number of feature descriptor values in a group is less than a threshold number.

3. The computer-implemented method of claim 1 wherein the set of source images comprises the first image, the second image, or both.

4. The computer-implement method of claim 1 wherein the step of registering into the tree model the set of features from the first image such that at least some of the leaf nodes of the tree model are associated with one or more feature identifiers of features from the first image further comprises the step of:

limiting the number of features from the first image that may be registered to any one leaf node.

5. The computer-implemented method of claim 1 wherein the step of selecting a best match feature in the first image from the one or more feature identifiers that are registered with the identified leaf node comprises:

for each feature from the first image that is registered with the identified leaf node, computing a descriptor distance between the feature descriptor value of the feature in the first image and the feature descriptor value of the query feature in the second image; and identifying as a matching feature the feature in the first image that has a smallest descriptor distance to the query feature in the second image.

6. The computer-implemented method of claim 1 further comprising the step of:

using matching features to generate a three-dimensional representation of at least a portion of an image in the first and second images.

7. A computer-implemented method for identifying corresponding features between stereo images, the method comprising:

given a set of features from a first image from the stereo images, wherein each feature comprises a feature descriptor value and a location in the first image, registering into a hierarchical k-means tree model the set of features from the first image such that at least some of the leaf nodes of the tree model are associated with one or more features from the first image; and finding corresponding features for a set of features from a second image of the stereo images using the tree model registered with features from the first image to efficiently identify candidate corresponding features;

further comprising generating the hierarchical k-means tree model by:

[a] clustering the feature descriptor values from a set of source images into a group, the group having an associated node value;

[b] subdividing at least one group of feature descriptor values into a plurality of groups, each group comprising an associated node value and one or more feature descriptor values assigned to the node value of the group; and

[c] repeating step [b] until a stop condition is reached;

wherein the finding step comprises:

for each query feature from a set of features second image, each feature from the second image comprising a feature descriptor value and a location in the second image:

querying the tree model to identify a leaf node that most closely corresponds to the query feature's feature descriptor value; and selecting a best match feature in the first image the one or more features that are registered with the identified leaf node.

8. The computer-implemented method of claim 7 wherein the step of selecting a best match feature in the first image from the one or more feature identifiers that are registered with the identified leaf node comprises:

for each feature from the first image that is registered with the identified leaf node, computing a descriptor distance between the feature descriptor value of the feature in the first image and the feature descriptor value of the query feature in the second image; and identifying as a matching feature the feature in the first image that has a smallest descriptor distance to the query feature in the second image.

9. The computer-implemented method of claim 7 further comprising the step of:

using matching features to generate a three-dimensional representation of at least a portion of an image in the first and second images.

10. A system for feature point matching in a first image and a second image that form a stereo pair of images, the system comprising:

one or more processors; and a non-transitory computer-readable medium or media comprising one or more sequences of instructions which, when executed by the one or more processors, causes steps to be performed comprising:

generating a hierarchical k-means tree model comprising leaf nodes using feature descriptor values from a set of source images;

given a set of features from a first image, each feature comprising a feature descriptor value, a location in the first image, and a feature identifier, registering into the tree model the set of features from the first image such that at least some of the leaf nodes of the tree model are associated with one or more feature identifiers of features from the first image; and for each query feature from a set of features from a second image, each feature from the second image comprising a feature descriptor value and a location in the second image:
    querying the tree model to identify a leaf node that most closely corresponds to the query feature's corresponding feature descriptor value; and
    selecting a best match feature in the first image from the one or more feature identifiers that are registered with the identified leaf node;
wherein the step of generating the hierarchical k-means tree model includes using recursive clustering and comprises;
[a] clustering the feature descriptor values from the set of source images into a group, the group having an associated node value;
[b] subdividing at least one group of feature descriptor values into a plurality of groups, each group comprising an associated node value and one or more feature descriptor values assigned to the node value of the group; and
[c] repeating step [b] until a stop condition is reached.

11. The system of claim 10 wherein a stop condition comprises at least one of:
    when a maximum distance of two feature descriptor values in a group is less than a threshold distance; and
    the number of feature descriptor values in a group is less than a threshold number.

12. The system of claim 10 wherein the set of source images comprises the first image, the second image, or both.

13. The system of claim 10 wherein the step of registering into the tree model the set of features from the first image such that at least some of the leaf nodes of the tree model are associated with one or more feature identifiers of features from the first image further comprises the step of:
    limiting the number of features from the first image that may be registered to any one leaf node.

14. The system of claim 10 wherein the step of selecting a best match feature in the first image from the one or more feature identifiers that are registered with the identified leaf node comprises:
    for each feature from the first image that is registered with the identified leaf node, computing a descriptor distance between the feature descriptor value of the feature in the first image and the feature descriptor value of the query feature in the second image; and
    identifying as a matching feature the feature in the first image that has a smallest descriptor distance to the query feature in the second image.

* * * * *